United States Patent [19]

Bruynooghe et al.

[11] Patent Number: 5,454,109
[45] Date of Patent: Sep. 26, 1995

[54] DATA PROCESSING SYSTEM WITH INTERFACE BETWEEN APPLICATION PROGRAMS AND EXTERNAL TOOLS RESIDING IN SEPARATE ENVIRONMENTS

[75] Inventors: Robert F. Bruynooghe, Crewe; Jeffrey M. Parker, Stoke-On-Trent, both of United Kingdom

[73] Assignee: International Computers Limited, United Kingdom

[21] Appl. No.: 155,466

[22] Filed: Nov. 19, 1993

[30] Foreign Application Priority Data

Nov. 19, 1992 [GB] United Kingdom ............. 9224224

[51] Int. Cl.[6] ................................................ G06F 9/44
[52] U.S. Cl. ................. 395/700; 364/DIG. 1; 364/280; 364/284; 364/229
[58] Field of Search ......................... 395/200, 650, 395/700; 364/DIG. 1, DIG. 2

[56] References Cited

U.S. PATENT DOCUMENTS 5,218,699  6/1993  Brandle et al. ................... 395/650
5,329,619  7/1994  Page et al. ........................ 395/200

OTHER PUBLICATIONS

Girish Welling et al., "An Architecture of a Threaded Many-to-many Remote Procedure Call", 12th Int. Conf. on Distributed Computing Systems, Jun. 9, 1992, IEEE Comp. Soc. Press, pp. 504–511.

Cui–Qing Yang et al., Software Practice & Experience, vol. 21, No. 5, "Utility Servers In Charlotte", May 1991, pp. 429–441.

*Primary Examiner*—Kevin A. Kriess
*Attorney, Agent, or Firm*—Lee, Mann, Smith, McWilliams, Sweeney & Ohlson

[57] ABSTRACT

A data processing system includes a first data processing environment including a plurality of application programs, and a second data processing environment including a plurality of software tools. A communication link interconnects the first and second environments. A tool agent in the first environment, provides an interface with each of the application programs. A tool server in the second environment, provides an interface with each of said tools.

1 Claim, 2 Drawing Sheets

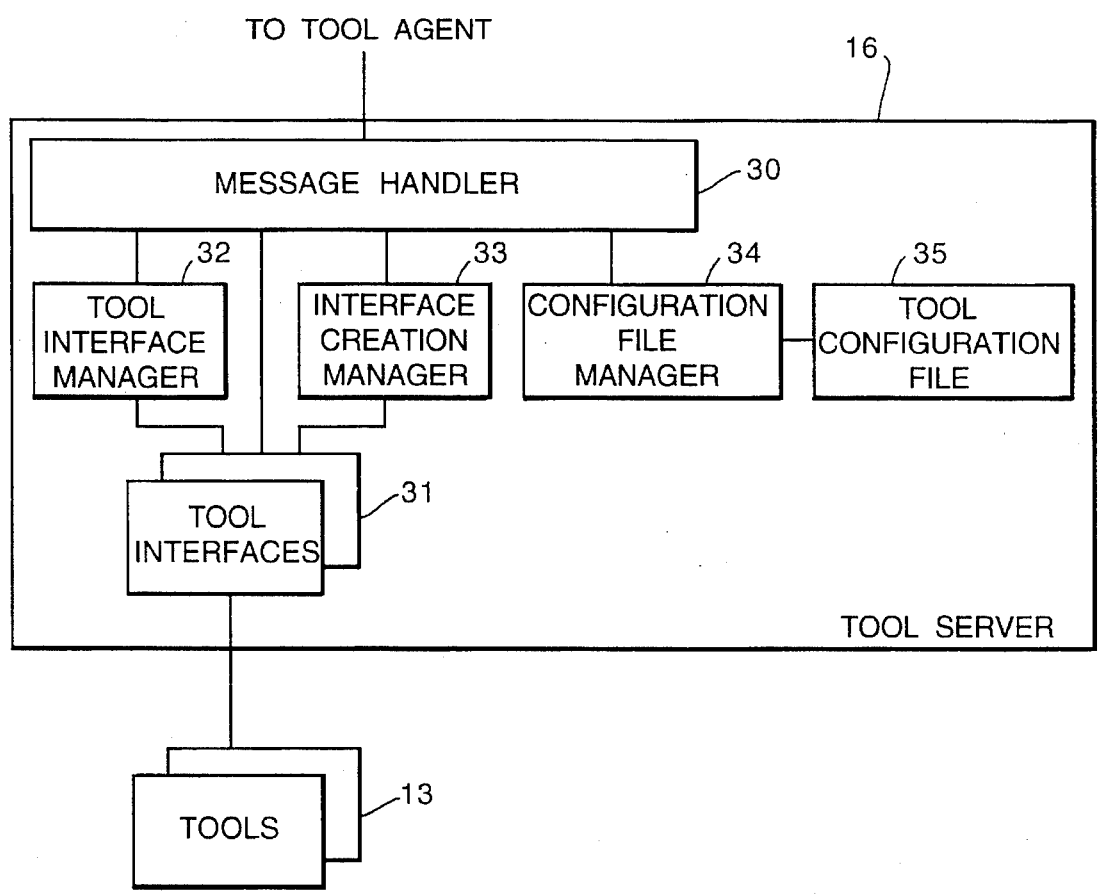

DATA PROCESSING SYSTEM WITH INTERFACE BETWEEN APPLICATION PROGRAMS AND EXTERNAL TOOLS RESIDING IN SEPARATE ENVIRONMENTS

BACKGROUND TO THE INVENTION

This invention relates to data processing systems.

Application programs running in a data processing system frequently require to make use of software tools, ie standard utility programs that perform some specified function. An example of such a tool is the UNIX date function, which returns the current real-time date. (UNIX is a trade mark of Unix System Laboratories Inc).

A problem arises when the application programs and the tools reside in different data processing environments. In such a case, some way must be provided to enable application programs to use the tools.

One way to achieve this would be to build-in to each application program a knowledge of the environment in which each required tool operates, so that the application program can communicate directly with the tool. However, this requires considerable effort on the part of the designer of the application program, and means that each application program has to be specially tailored to take the account of the tools that it might use.

The object of the present invention is to provide a way of overcoming this problem.

SUMMARY OF THE INVENTION

According to the invention there is provided a data processing system comprising:

a first data processing environment including a plurality of application programs, a second data processing environment including a plurality of software tools, a communication link interconnecting the first and second environments tool agent means in the first environment, providing an interface with each of said applications and tool server means in the second environment, providing an interface with each of said tools and communicating with the tool agent.

It can be seen that the tool agent and tool server thus provide an interface between application programs and external tools residing in separate environments, which avoids the need for the application programs to have any specific knowledge of the tool environment.

BRIEF DESCRIPTION OF THE DRAWINGS

FIG. 3 is a block diagram showing the tool server in more detail.

DESCRIPTION OF AN EMBODIMENT OF THE INVENTION

One data processing system in accordance with the invention will now be described by way of example with reference to the accompanying drawing.

Figure 1:
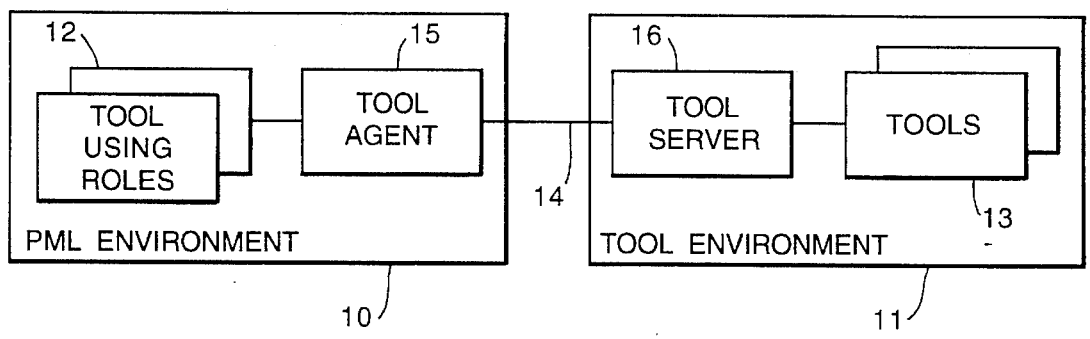
FIG. 1 is a block diagram schematic diagram of a data processing system in accordance with the invention, including a tool agent and tool server.

Referring to FIG. 1, the system comprises a PML environment 10 and a tool environment 11. The PML environment 10 is a data processing environment residing on a first computer and running under the persistent object-oriented language PML. For details of PML, reference is made to the PML Reference Manual, published by International Computers Limited, ICL Product No 58239/1. The tool environment 12 is a standard UNIX environment, residing on a physically separate computer.

The PML environment 10 includes a number of tool using roles 12, each of which is an application program for performing some particular task. The nature of these tool using roles 12 forms no part of the present invention and so need not be described in any further detail.

The tool environment 11 includes a number of external software tools 13, for performing various functions. For example, these tools may include a UNIX sort tool, a UNIX editor tool and a UNIX date function.

The environments 10, 11 are interconnected by a communication link 14 which includes a physical link between the computers as well as the control software for providing the required communications protocol.

The tool using roles 12 in the PML environment can access the tools 13 in the tool environment by way of an interface mechanism, comprising a tool agent 15 and a tool server 16. These make use of a tool protocol, comprising a predefined set of commands.

The tool server 16 is a utility program which executes in the tool environment 11 and which performs all the necessary actions to cause the external tools 13 to be executed. The tool server controls a number of tools, as shown.

The data processing system may include a number of such tool servers, each handling one or more classes of external tool. For example, separate tool servers may be provided for tools running under different operating systems.

The tool agent 15 is a program which runs in the PML environment 10, and which acts as a surrogate for the tool server in that environment. The tool agent performs all the necessary actions to allow the tool using roles 12 to communicate with the external tools 13.

Tool Agent

Figure 2:
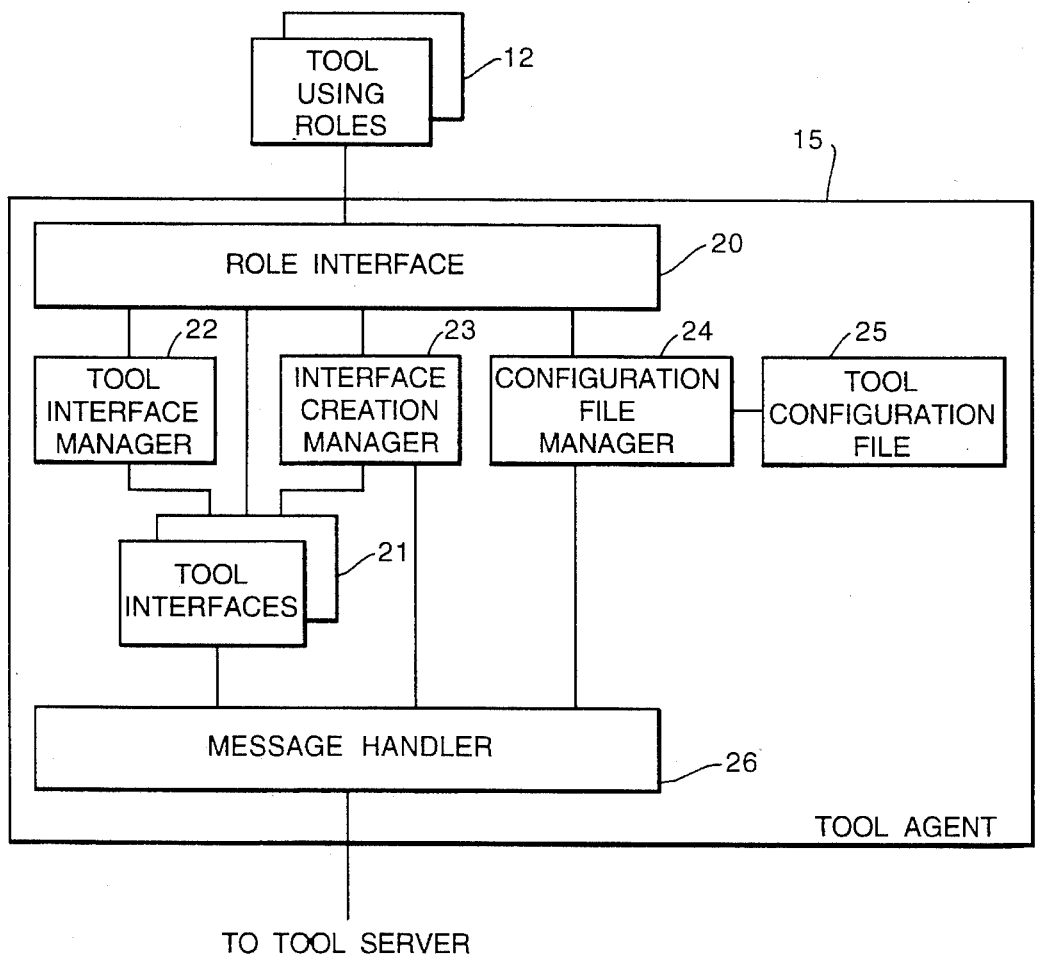
FIG. 2 is a block diagram showing the tool agent in more detail.

Referring now to FIG. 2, the tool agent 15 comprises a role interface 20, a number of tool interfaces 21, a tool interface manager 22, an interface creation manager 23, a configuration file manager 24, a tool configuration file 25 and a message handler 26.

The role interface 20 handles communications between the tool agent 15 and the roles 12. The role interface 20 receives requests from the roles and passes each request to the tool interface manager 22, interface creation manager 23 or configuration file manager 24 according to the request type. The role interface also receives messages from the tool interface manager, the tool interfaces, the interface creation manager and the configuration file manager, and passes each message to one of the roles, as specified by a destination address in the message.

Each tool interface 21 acts as a mediator between the PML of a particular role 12 and a particular tool 13. It receives PML objects from the role and converts them into messages in the tool protocol, for passing to the tool by way of the message handler 26. Each tool interface 21 also receives messages from the tool interface manager 22 in the tool protocol, and converts these into appropriate PML objects for passing to the roles 12. The tool interfaces 21 are also responsible for handling the control of any messages from the tool server that are required to be directed immediately to one of the tool using roles. They are also responsible for buffering these messages.

The tool interface manager 22 provides point-to-point connection between the tool agent and the tool server. It receives text messages over the communication link 14 from the tool server, by way of the message handler 26, and converts them into the tool protocol for passing to the tool interfaces 21. It also receives messages in the tool protocol from the tool interfaces and converts them into text messages for sending over the link to the tool server, by way of the message handler 26.

The interface creation manager 23 manages the creation and destruction of the tool interfaces 21. Initially, the tool agent contains no tool interfaces. Tool interfaces are then created as required, in response to creation request messages from the roles, as will be described.

Tool Server

Referring now to FIG. 3, the tool server 16 comprises a message handler 30, tool interfaces 31, a tool interface manager 32, an interface creation manager 33, a configuration file manager 34, and a tool configuration file 35.

The tool interface manager 32 provides point-to-point connection between the tool server and the tool agent. It receives text messages over the communication link from the tool agent by way of the message handler 30 and converts these into tool protocol messages for passing to the tool interfaces 31. It also receives tool protocol messages from the tool interfaces 31 and converts these into text messages for sending over the communication link to the tool agent, by way of the message handler 30.

The interface creation manager 33 manages the creation and destruction of the tool interfaces 31. Initially, the tool server contains no tool interfaces. Tool interfaces are then created as required, in response to creation request messages from the roles, as will be described.

Each tool interface 31 acts as a mediator between the tool protocol and the actual tool being invoked. It converts tool protocol messages received from the tool interface manager 32 into appropriate operating system calls (or public tool interface calls) for the associated external tool environment. It also performs any necessary transformations on data sent to or returned by the tool.

The tool configuration file 35 contains a record for each tool supported by the tool server. Each of these records contains information required for creating a corresponding pair of tool interfaces 22, 31 in the tool agent and tool server, along with other information about the tool.

As will be described, when a tool server logs into the PML environment, it exports its tool configuration file to a tool agent in that environment, and the tool agent uses this to update its own configuration file 25.

The operation of the system will now be described.

Tool Server Log In

When a tool server is started up it logs into the PML environment, indicating the name and password of the tool agent with which it wishes to be associated. Only one tool server may log into a particular tool agent at a time. If log in is successful, the tool agent returns an acknowledgment message to the tool server.

The message handler 30 in the tool server receives this acknowledgement message and passes it to the configuration file manager 34. The configuration file manager then accesses its tool configuration file 35 and passes it to the message handler 30, for transmission to the tool agent.

The message handler 26 in the tool agent receives the configuration file and passes it to the configuration file manager 24. The configuration file manager 24 then updates the tool configuration file 25.

If at any time during operation a new tool is added to the tool server, the configuration file 35 in the tool server is updated, and a similar procedure is performed to ensure that the corresponding configuration file 25 in the tool agent is also updated.

Role Information Request

If one of the roles 12 requires information about what tools are available to it, the role sends an information request to the tool agent. The role interface 20 passes this request to the configuration file manager 24.

The configuration file manager 24 then accesses the tool configuration file 25 to obtain the required information, and passes this information back to the role by way of the role interface 20.

Tool Creation Request

When one of the roles wishes to use a remote tool, it sends a tool creation request to the tool agent 15. The request is passed, by of the role interface 20, to the interface creation manager 23. The interface creation manager first accesses the configuration file manager 24, to check whether the requested tool is supported by the tool agent. If so, the interface creation manager then creates a new instance of the tool interface 21 for communicating with the tool using role. The interface creation manager 23 also passes this request to the tool server 16, by way of message handler 26.

The message handler 30 in the tool server passes this request to the interface creation manager 33. The interface creation manager 33 then creates a new instance of the tool interface 31, and registers it with the tool interface manager 32. Finally, the interface creation manager 33 returns an acknowledgement message to the tool agent, this message containing a handle which can be used to identify the tool in future communications.

The message handler 26 in the tool agent passes this acknowledgement message to the interface creation manager 23.

The interface creation manager 23 then records the handle with the newly created tool interface, and registers the tool interface with the tool interface manager 22. Finally, the interface creation manager 23 returns the identity of the newly created tool interface to the requesting role.

The role may now interact with the tool agent, so as to make use of the remote tool as if it were a local tool in the PML environment.

Tool Message Request

When a role requires to send a message to a tool, it passes a tool message request to the tool agent by way of role interface 20. The role interface passes this request to the tool interface manager 22. The tool interface manager 22 then looks up the appropriate tool interface 21 and passes the request to it.

The tool interface 21 converts the request into a message in the tool protocol, and passes it to the message handler 26 by way of the tool interface manager for transmission to the tool server.

The message handler 30 in the tool server then passes this message to the tool interface manager 32, which in turn passes the message to the appropriate tool interface 31. The tool interface 31 then converts the tool protocol message into a call to the required tool 13.

Message from Tool

When a tool 13 requires to return a message to the tool using role, it passes the message to the tool interface 31 in the tool server.

The tool interface 31 converts the message into the tool protocol, and passes it to the message handler 30 for transmission to the tool agent.

The message handler 26 in the tool agent passes this message to the tool interface manager 22. The tool interface manager then looks up the appropriate tool interface 21 and passes on the message to that interface. Finally, the tool interface converts the message into a PML object for passing to the tool using role.

What is claimed is:

1. A data processing system comprising:

(a) a first computer, providing a first data processing environment;

(b) a second computer, providing a second data processing environment;

(c) a communications link interconnecting said first computer and said second computer;

(d) a plurality of applications programs residing in said first data processing environment on said first computer;

(e) a plurality of software tools residing in said second data processing environment on said second computer;

(f) tool agent means in said first data processing environment; and (g) tool server means in said second data processing environment;

(h) said tool agent means comprising means for receiving a request from one of said applications programs, said request specifying one of said software tools;

(i) said tool agent means also including interface creation means, operative in response to said request, for creating an interface within said tool agent;

(j) said tool agent means also including means for passing said request to said tool server means by way of said communications link; and (k) said tool server means comprising further interface creation means, operative in response to said request, for creating an interface within said tool server;

(l) said interface within said tool agent and said interface within said tool server together forming an interface for allowing said one of said application programs to communicate with said one of said software tools by way of said communications link.

* * * * *